Inventor:
Ferdinand Zerlauth
BY Pennie, Edmonds,
Morton, Taylor and Adams
ATTORNEYS

United States Patent Office 3,544,232
Patented Dec. 1, 1970

3,544,232
HOUSING FOR TURBOMACHINES
Ferdinand Zerlauth, Winterthur, Switzerland, assignor to Sulzer Brothers Limited, Winterthur, Switzerland, a company of Switzerland
Filed Oct. 11, 1968, Ser. No. 766,924
Claims priority, application Switzerland, Mar. 22, 1968, 4,331/68
Int. Cl. F01d 1/00, 29/40
U.S. Cl. 415—219            7 Claims

ABSTRACT OF THE DISCLOSURE

There is disclosed an axially split housing for turbomachines, the housing comprising a body made up of two cast steel halves held together by bolts extending across the plane of division between U-shaped lugs welded to the exterior of the housing halves.

---

The present invention pertains to a housing for turbomachines, and more particularly to an axially split housing for turbomachines such as high temperature turbines. The term turbomachine is intended to denote a turbine-type machine whether for development of mechanical energy at a rotating shaft from a fluid flowing through the machine as in a turbine, or for the delivery of energy from a rotating shaft to the fluid, as in a pump or compressor. In accordance with the invention, the housing includes an annular body in the shape of a body of revolution and parts which, not having the shape of bodies of revolution extending over the entire periphery of the housing, are either cast or made of shaped sheet metal and are welded to the body of revolution. The housing of the invention is advantageously split along a plane containing its axis of symmetry. U-shaped fastening lugs are welded to the housing with the plane defined by their two legs disposed parallel to the plane of parting between the two halves of the housing so as to accommodate bolts. The lugs may be provided, on the side thereof away from the parting plane, with plates to center the bolts and to take the stress of nuts threaded onto those bolts. For the direct transfer of tangential stresses from the housing to those bolts, these plates desirably extend into grooves on the exterior of the housing. These plates may be provided with a bore to receive the fastening bolts with a small amount of play or clearance. These holes may have a sawtooth edge, fitting with a complementary set of sawteeth on the bolts. The studs may have collars affixed thereto, to prevent them from falling through the holes in the plates.

BRIEF DESCRIPTION OF THE DRAWING

The invention will now be further described in terms of a nonlimitative presently preferred exemplary embodiment thereof and with reference to the accompanying drawings, in which.

DESCRIPTION OF THE PREFERRED EMBODIMENT

Figure 1:
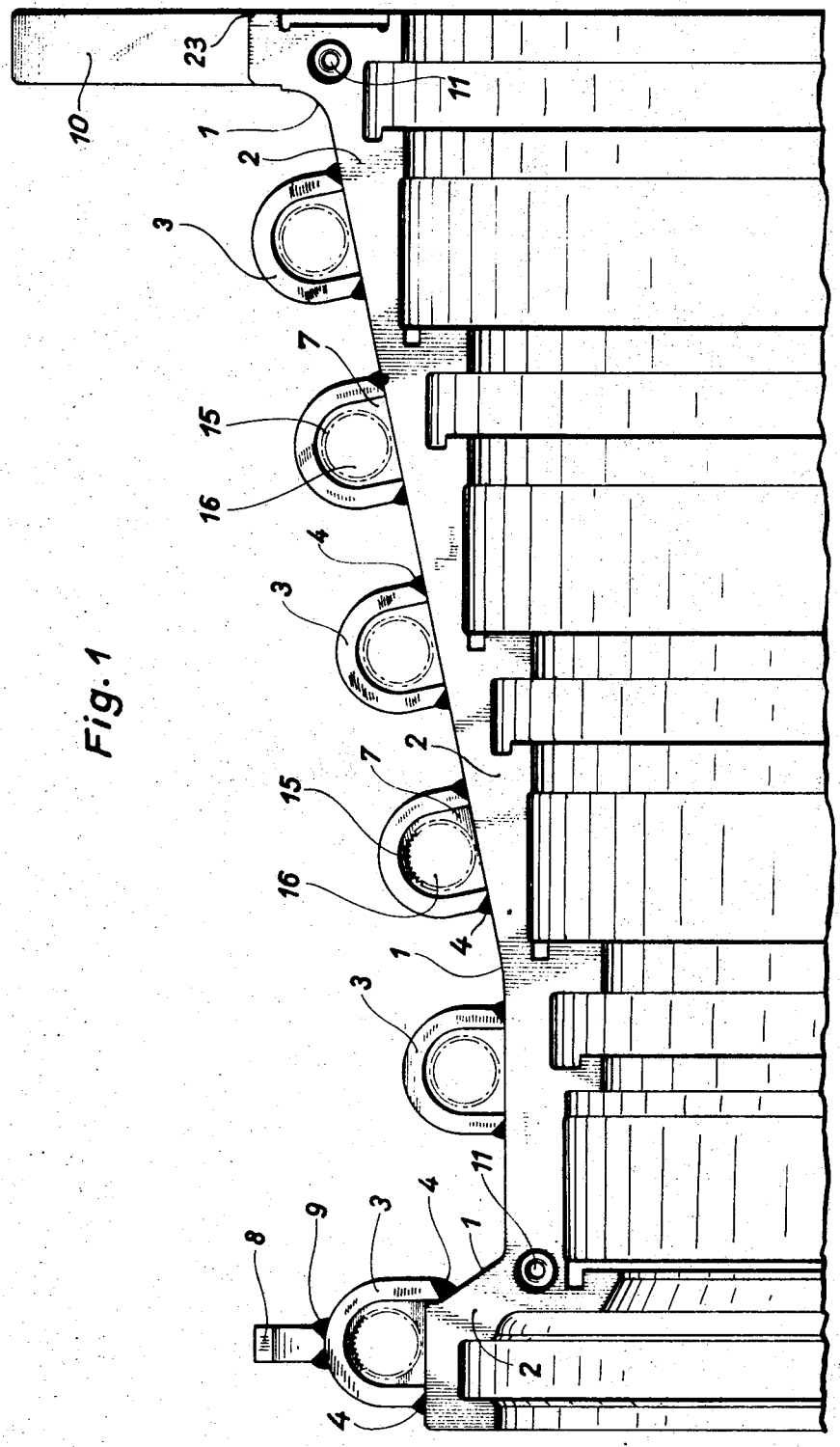
FIG. 1 is a fragmentary plan view of one half of a housing according to the invention, the housing half being seen at the parting plane which separates it from the other half of the housing.
Figure 2:
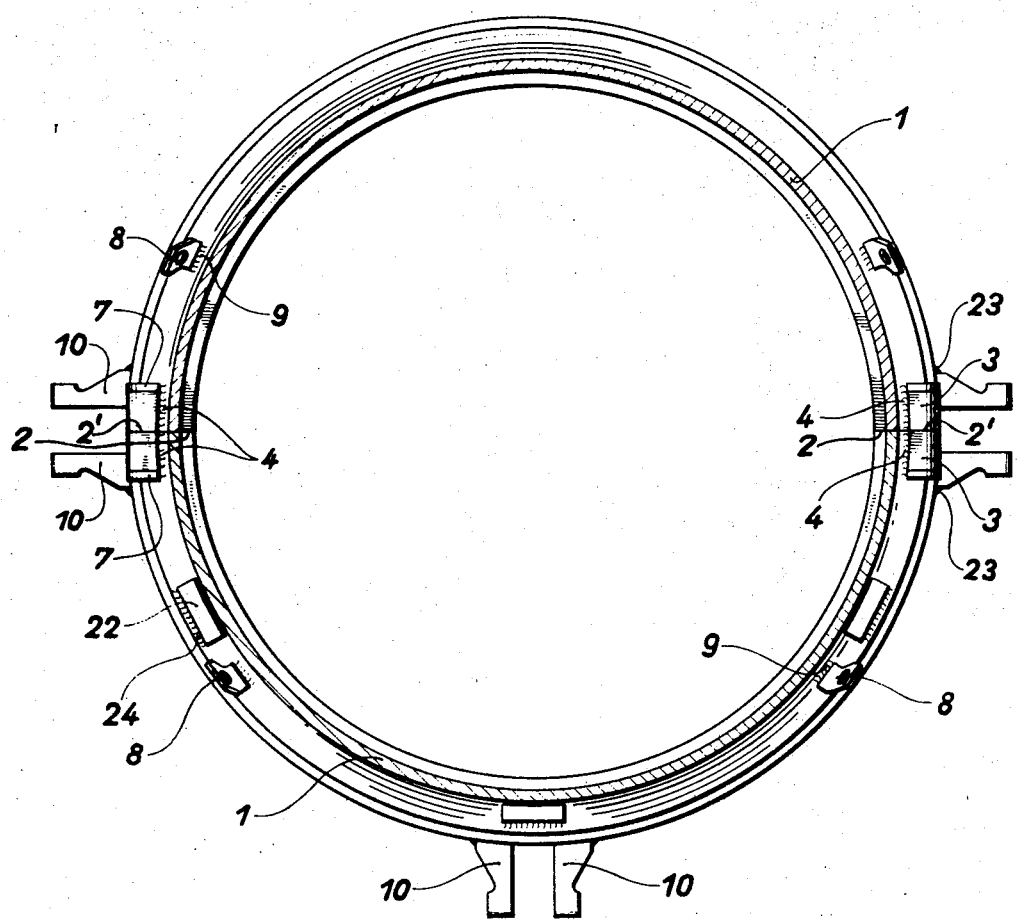
FIG. 2 is a cross-sectional view of the housing of FIG. 1.
Figure 3:
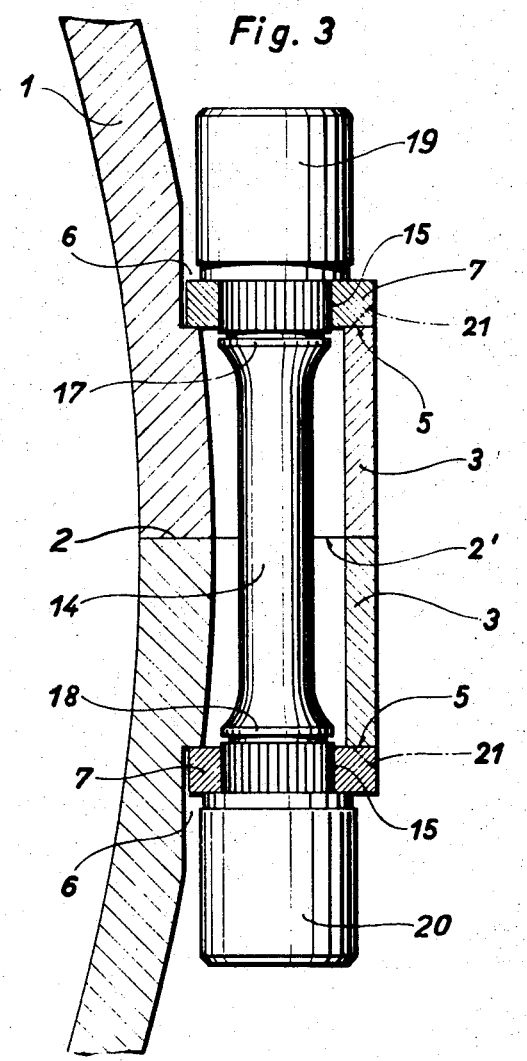
FIG. 3 is a detailed sectional view, taken in a plane perpendicular to the axis of the housing of FIGS. 1 and 2 through one of the pairs of lugs by which the two halves of the housing are held together with the aid of bolts, one of which is seen in FIG. 3.
Figure 4:
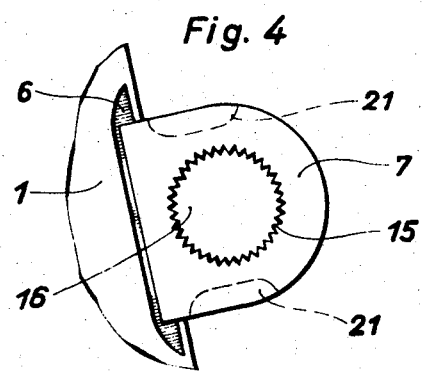
FIG. 4 is a plan view of one of the cover plates employed in conjunction with the lugs of FIG. 3.

The housing according to the invention illustrated in FIG. 1 includes a body 1 which may be of cast steel and which, as a result of machining operations performed thereon, possesses the shape of a body of revolution both on its inner and outer surfaces. Parts of the housing which do not extend over the whole periphery of the body and which are not rotationally symmetric in shape are made of shaped sheet material or of castings and are fastened by welding to the body 1. The body 1 itself is divided along an axial plane 2 into two halves which are fastened tightly together by means of bolts 14 (FIG. 3). To this end each half of the body is provided with lugs 3 fastened thereto by weld seams 4. These lugs are of U-shape in cross sections parallel to the parting plane 2, and can be described as having the shape of short tunnels or, approximately, of short semicylinders. The lugs 3 are disposed in pairs facing each other across the parting plane as illustrated in FIGS. 2 and 3 so that the bolts 14 may pass through them with a certain amount of clearance or play. The stress of the bolts is borne and their centering is effected by cover plates 7 disposed on the exterior end surfaces 5 of the lugs. These cover plates are fastened to the lugs by means of short weld seams 21 (FIG. 3). The bores 16 through these plates are serrated as indicated at 15 and receive bolts which are provided with complementary serrations. Moreover, the bolts possess adjacent to these cover plates collars 17 and 18 preventing the bolts from falling out after removal of their nuts 19 and 20. The cover plates 7 are disposed on the exterior end surfaces of the lugs 3 and additionally lie in part within grooves 6 in the exterior surface of the housing body 1, so that tangential forces are transferred from the body 1 through the cover plates 7 and the nuts 19 and 20 directly to the bolts, without passing through the lugs 3.

Figure 5:
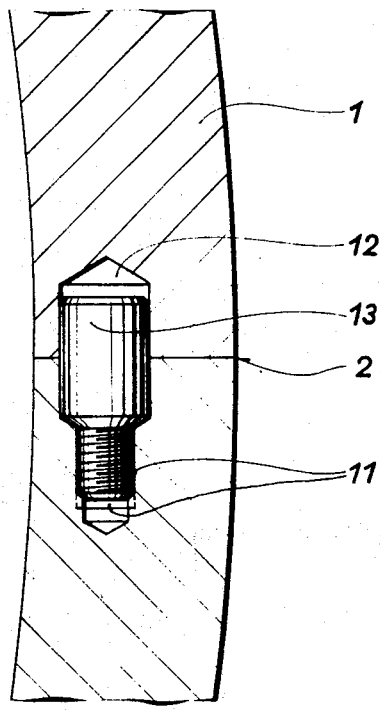
FIG. 5 is a fragmentary sectional view through the housing of FIGS. 1 and 2, taken in a plane perpendicular to the axis of the housing and showing a centering pin for positioning of the two halves of the housing with respect to each other.
Figure 6:
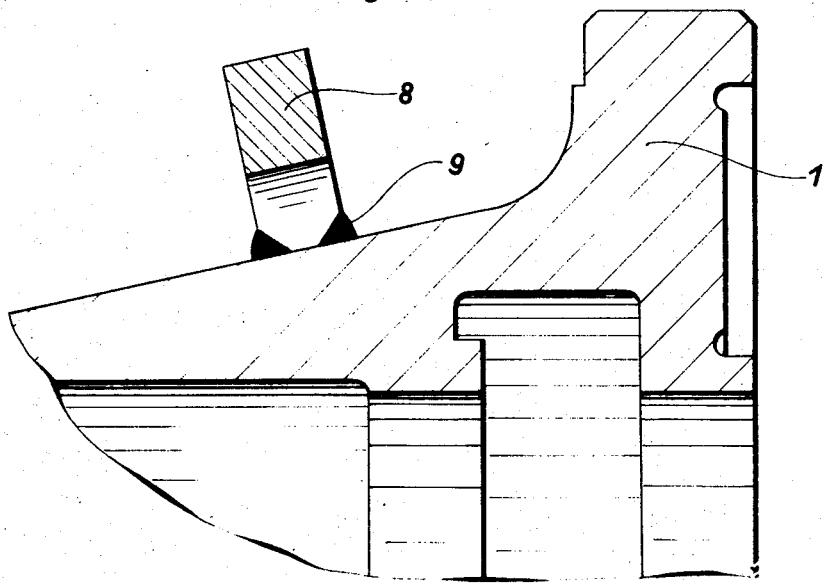
FIG. 6 is a detail view of a lifting lug or ring on the housing of FIG. 1.

A large number of other parts which however do not extend around the periphery of the housing, such as for example suspension rings 8, centering members 10 and the pads 22 for fastening of mounting legs may be made of flat material such as sheet which is cut, hot formed if necessary, and fastened by weld seams 9, 23 or 24 to the housing. For centering the two halves of the housing the parting surfaces 2 are provided with matching bores 11 and 12 (FIG. 5). Centering pins 13 fit into the bores 11, the heads of these pins passing into the bores 12 so that the two halves of the housing are fastened to each other without possibility of slipping one with respect to the other.

For manufacture of the housing of the invention there is first produced an annular steel casting having a size necessary for the end dimensions required. The division of the housing into two halves along an axial plane, which is made after casting, requires that the casting be initially of slightly oval cross section so that after the cut, the two halves will form together substantially a body of revolution. The cut is made by means of a torch. The rough parting edges thus produced can then be milled down to dimensions approaching the desired end dimensions therefor. For further working of the exterior surface of the housing the two casting halves are then fastened together at their parting surfaces with the aid of straps temporarily affixed to the interior, across the parting plane. The annular structure so reconstructed can then be fastened in a lathe or similar machine and can be turned on its outside to the desired end dimensions.

After removal from the lathe, the fastening or assembly lugs 3 are welded to the exterior. By removing the straps applied to permit the initial turning operation, the two halves of the body can then be separated again from each other. The parting surfaces 2 of the two halves of the body, and the end surfaces 2' of the lugs 3 at those parting surfaces (FIG. 3) are carefully worked to definitive dimensions. This working can also be done by milling. The depth of cut employed in this process can be held so small that when the two halves are reunited, the departure of the exterior from the rotationally symmetric surface worked up on the lathe will be entirely negligible. At this time the bores 11 and 12 provided for the centering pins 13 at the parting surfaces are also finished. The faces 5 on the lugs 3 and the grooves 6 for receipt of the cover plates 7 can be produced by milling operations in the same fixture as that employed for fine working of the parting surfaces 2. Advantageously at this stage all other housing parts which are not of rotationally symmetric shape and do not extend around the periphery of the housing will be welded thereto. The housing halves thus prepared are then fastened together by means of bolts 14 and can be set again into the lathe to have the inner surface thereof turned. At this time the plane surfaces for the centering members 10 can be worked.

If necessary, bores can at this or an earlier stage be formed in the housing for flow of cooling air. In order to achieve a tight seal between the two halves of the housing at their parting surfaces 2, those surfaces, already finely milled, can be further worked by hand, for example by scraping.

In the operation of a turbomachine having a housing in accordance with the invention a substantially uniform temperature field can be achieved. Likewise, the housing will have an optimum approach to a symmetrical distribution of masses, in particular if it includes no flanges for joining the two halves thereof together but rather only lugs as shown in the example described. This construction assures a highly symmetrical course of thermal expansion and contraction of the housing. In this way the danger of deformation and especially of bending of the housing is substantially eliminated. Stresses due to temperature falls are held to the minimum possible value.

While the invention has been described hereinabove in terms of a presently preferred embodiment thereof, the invention itself is not limited thereto but, rather, comprehends all modifications of and departures from that embodiment properly falling within the spirit and scope of the appended claims.

I claim:

1. A housing for a turbomachine comprising a rotationally symmetric annular body, and nonrotationally symmetric accessory elements welded thereto, said body being split along a plane parallel to the axis of symmetry thereof, said housing including U-shaped lugs affixed to the two halves of the body on opposite sides of said plane in position to accept bolts with clearance.

2. A housing according to claim 1 wherein said lugs are made of sheet metal bent into shape.

3. A housing according to claim 1 including apertured plates over the ends of the lugs away from said plane, and nuts threaded on said bolts and centered by said plates.

4. A housing according to claim 3 wherein said plates are welded to said lugs.

5. A housing according to claim 3 wherein said plates are received in grooves formed on the exterior of said body.

6. A housing according to claim 3 wherein said plates and bolts are complementarily serrated.

7. A housing according to claim 3 wherein said bolts include at least one annular enlargement incapable of passing through said apertured plates.

References Cited

UNITED STATES PATENTS 2,095,128  10/1937  Doran _____ 253—39

FOREIGN PATENTS 1,099,824  2/1961  Germany.
510,672  8/1939  Great Britain.

HENRY F. RADUAZO, Primary Examiner

U.S. Cl. X.R.

415—134